United States Patent [19]
Unekawa

[11] Patent Number: 5,815,499
[45] Date of Patent: Sep. 29, 1998

[54] ATM SWITCH ADDRESS GENERATING CIRCUIT

[75] Inventor: Yasuo Unekawa, Kawasaki, Japan

[73] Assignee: Kabushiki Kaisha Toshiba, Tokyo, Japan

[21] Appl. No.: 679,492

[22] Filed: Jul. 12, 1996

[30] Foreign Application Priority Data

Jul. 13, 1995 [JP] Japan ................................. 7-177609

[51] Int. Cl.$^6$ ................................................. H04L 12/54
[52] U.S. Cl. ........................................ 370/395; 370/429
[58] Field of Search .................................. 370/395, 412, 370/428, 429, 465, 474, 475

[56] References Cited

U.S. PATENT DOCUMENTS 5,455,825 10/1995 Lauer et al. .......................... 370/395
5,612,952 3/1997 Motoyama ............................ 370/395
5,696,764 12/1997 Soumiya et al. ..................... 370/395

Primary Examiner—Melvin Marcelo
Attorney, Agent, or Firm—Loeb & Loeb LLP

[57] ABSTRACT

The proposed address generating circuit of an ATM (asynchronous transfer mode) switch can support a plurality of service classes by use of a single LSI under such a management that the cell buffers are divided for each service class. That is, an address generating circuit of shared buffer type ATM switch for an ATM switch system comprises a plurality of address generating units (5) each for storing a routing tag indicative of a cell output port, an address, and class data indicative of a service class of each of data cells stored in shared cell buffers. When data cells are inputted to and outputted from the shared cell buffers, the routing tags and the addresses of the address generating units (5) each having matching cell class data are selected and used.

12 Claims, 18 Drawing Sheets

FIG. 19
PRIOR ART

| NULL | N |     | (N)   | NULL |
|------|---|-----|-------|------|
| NULL | N-1 |   | (N-1) | NULL |
| ⋮ | ⋮ |      | ⋮     | ⋮    |
| NULL | 4 |     | (4)   | NULL |
| 0    | 3 |     | (3)   | D    |
| 1    | 2 |     | (2)   | C    |
| NULL | 1 |     | (1)   | NULL |
| NULL | 0 |     | (0)   | NULL |

| NULL | 0 |     | (N)   | NULL |
|------|---|-----|-------|------|
| NULL | N |     | (N-1) | NULL |
| ⋮ | ⋮ |      | ⋮     | ⋮    |
| NULL | 5 |     | (4)   | NULL |
| NULL | 4 |     | (3)   | D    |
| 0    | 3 |     | (2)   | C    |
| 1    | 2 |     | (1)   | NULL |
| NULL | 1 |     | (0)   | NULL |

101, 108, 102          109

ATM SWITCH ADDRESS GENERATING CIRCUIT

BACKGROUND OF THE INVENTION

1. Field of the Invention

The present invention relates to an ATM (asynchronous transfer mode) switch address generating circuit, and more specifically to an address generating circuit of shared buffer type ATM switch used for an ATM switching system.

2. Description of the Prior Art

The ATM switch realizes such operation that each data cell can be switched to each destination on the basis of each destination data (referred to as routing tag, hereinafter) added to each ATM cell. Here, the ATM switch can be classified into input-buffer type, output-buffer type, and shared buffer type according to the arrangement of the cell buffers each for accumulating each data cell. Here, in general, when the total number of the cell buffers is constant, the shared buffer type ATM switch is the most excellent in the cell loss rate characteristics.

Further, as buffer address management systems for the shared buffer type ATM switch, a linked list system, a shift register system, etc. are so far known.

In the ATM switch of the ATM switch system as described above, there exists a multicasting function as one of the functions realized by the ATM switch. The multicasting function is such a function that input cells are copied and then outputted through a plurality of output ports. However, when the multicasting is realized by the linked list system, some problems arise in that (1) the throughput of the multicasting is limited; (2) the cell buffers cannot be utilized effectively; etc. In contrast with this, in the case of the shift register system, the multicasting can be realized easily by preparing a plurality of registers for storing the routing tags, whose number is the same as that of the output ports, as described hereinbelow.

Here, the summary of a prior art address generating circuit for realizing the shift-register type address management system will be explained hereinbelow with reference to FIG. 12.

In FIG. 12, a plurality of address generating units 104 are connected to each other in a loop state through a routing tag input bus 105, a control bus 106, and an address pointer output bus 107 each corresponding to each address generating unit 104. Each address generating unit 104 is composed of a routing tag register 101 for storing a cell routing tag (destination data of a cell), an address pointer register 102 for storing an address of each cell buffer (not shown in FIG. 12) for storing each data cell, and a column control circuit 103 for controlling these elements. Further, cell routing tags are transferred to the routing tag input bus 105 through a switch input section (not shown), and control data of the address generating circuit are transferred to the control bus 106, respectively. Further, the write addresses in the cell buffers and the read addresses from the cell buffers are all transferred to the address pointer output bus 107, respectively.

The positional relationship of the respective address generating units 104 corresponds to cell arrival sequences; that is, the arrival times of the cells corresponding to the address generating units 104 positioned on the lower side are earlier than the arrival times of the cells corresponding to the address generating units 104 positioned on the upper side in FIG. 12. Therefore, in order to output the data cells to be transmitted to an output port in accordance with the correct time sequence, the address generating circuits are searched beginning from the lower side, to detect the address generating units 104 in each of which the routing tag to be transmitted to the output port is stored, in sequence. Here, an address stored in the address pointer register 102 of the detected address generating unit 104 is a read address of the cell buffer.

In the address generating circuit, the address management of the shift register type can be realized on the basis of a series of three operations such as input operation, output operation and shift operation as follows:

The input operation is effected whenever data cells are inputted. During the data cell input, the routing tags attached to the cells are transferred to the address generating circuit, and the vacant columns of the address generating circuit are searched from the lower side. Further, the routing tag is inputted to the first-searched vacant column, and the address pointer value of the searched vacant column is transferred to the cell buffer, so that the data cell can be written in the cell buffer.

FIG. 13 to 17 show the internal states of the address generating circuit 108 and the cell buffers 109, respectively. FIGS. 13 shows the initial internal states of both; FIG. 14 shows the internal states of both obtained when a cell A having a routing tag 0 has been inputted from the internal states shown in FIG. 13; FIG. 15 shows the internal states of both obtained when a cell B having a routing tag 1 has been inputted from the internal states shown in FIG. 14; FIG. 16 shows the internal states of both obtained when a cell C having a routing tag 1 has been inputted from the internal states shown in FIG. 15; and FIG. 17 shows the internal states of both obtained when a cell D having a routing tag 0 has been inputted from the internal states shown in FIG. 16, respectively.

The output operation is effected whenever data cells are outputted. During the cell output, the columns of the address generating circuit, which have the routing tags matching the output port, are searched from the lower side, and the address pointer value of the first-searched column is transferred to the cell buffer to read the cell from the cell buffer. Further, the routing tag of the outputted column is reset to a vacant column. That is, the cell form which a cell has been already outputted becomes a vacant column.

FIGS. 18 shows the internal states of the address generating circuit 108 and the cell buffers 109 obtained when the cell A to be transmitted to the output port "0" has been outputted from the internal states shown in FIG. 17; and FIGS. 19 shows the internal states of both obtained when the cell B to be transmitted to the output port "1" has been outputted from the internal states shown in FIG. 18.

The shift operation is effected to fill the vacant columns caused by the output operation with data. During the shift operation, the vacant columns of the address generating circuit 108 are searched from the lower side, and the address pointer value of the first-searched vacant column is outputted to the address pointer output bus 107. Further, at the same time, the values of the column just over the first-searched vacant column are shifted to the one-stage lower column (the same as the first-searched column). Further, the address pointer value outputted to the address pointer output bus 107 is inputted to the uppermost column.

FIG. 20 shows the internal states of the address generating circuit 108 and the cell buffers 109 obtained after the first shift has been executed from the states shown in FIG. 19 to fill one vacant column; and FIG. 21 shows the internal states of the address generating circuit 108 and the cell buffers 109 obtained after the second shift has been executed from the states shown in FIG. 20 to fill another vacant column.

In the above-mentioned address generating circuit, the multicasting function can be realized easily by preparing a plurality of the routing tag registers 101 whose number is the same as that of the output ports. For instance, when four output ports are provided, as shown in FIG. 22, each bit of the routing tag registers 101 is allowed to correspond to each output port (in one-to-one correspondence relationship), and a bit (e.g., "1") is set to each of the routing tag registers 101 which correspond to the output ports to be multicasted. Although the input operation and the shift operation of the multicasting are both the same as those already explained, the output operation is different from the operation already explained merely in that the routing tag bits corresponding to the output ports of the columns from which the cells have been outputted are reset.

In the prior art shared buffer type ATM switch LSI which adopts the shift register type address management system as described above, since the capacity of the cell buffers is inevitably limited to about 256 cells due to the restriction of the chip size, when a plurality of service classes of different traffic types must be supported by one switch LSI, the capacity of the cell buffers is not sufficient from the standpoints of the throughput. Here, as the service classes of different traffic types, there are CBR (constant bit rate), VBR (variable bit rate), ABR (available bit rate), etc., for instance. Consequently, in order to support a plurality of service classes with the use of one switch LSI, a two-plane switch constructed by two switch boards has been so far used, in such a way that one switch board is used to handle CBR/VBR cells by previously allocating the line bands on the basis of CAC (call admission control) and the other switch is used to handle ABR without any line band allocation.

With the advance of the recent microminiaturization technique, however, since the number of cell buffers integrable within a single switch LSI has been increased up to about 512 cells, it has been possible to support a plurality of service classes by use of a single LSI from the standpoint of the number of cell buffers. Therefore, in the shared buffer type switch LSI, there exists a need of proposal of an address management system which can support a plurality of service classes effectively and adaptively by use of a single LSI.

As described above, in the prior art shared buffer type ATM switch, since the cell buffer capacity has been subjected to a restriction due to the chip size, it has been impossible to support a plurality of service classes by use of a single chip LSI; in other words, the service classes have been so far supported by use of a plurality of LSI chips, with the result that there so far exist some problems in that the construction thereof is large-scaled and the number of the manufacturing steps thereof increases.

SUMMARY OF THE INVENTION

With these problems in mind, therefore, it is the object of the present invention to provide an address generating circuit of an ATM (asynchronous transfer mode) switch usable for the ATM switch system, which can support a plurality of service classes by use of a single LSI under such a management that the cell buffers can be divided and allocated logically for each service class.

To achieve the above-mentioned object, the present invention provides an address generating circuit of shared buffer type asynchronous transfer mode switch used for an asynchronous transfer mode switching system, which comprises: a plurality of address generating units (5) each provided for each column, for storing a routing tag indicative of an output port of each cell stored in a shared buffer (10), an address of each cell, and class data indicative of a service class of each cell, respectively; and wherein: when a cell is inputted to or outputted from the shared buffer (10), a routing tag and an address stored in each address generating unit for storing the class data the same as the class data of the inputted or outputted cell are selected and used.

Further, said address generating units (5) each including: a routing tag register (1) for storing a routing tag indicative of an output port of each cell inputted to or outputted from the shared buffer (10); an address pointer register (2) for storing an address of each cell inputted to or outputted from the shared buffer (10); a class data register (3) for storing class data indicative of a service class of each cell inputted to or outputted from the shared buffer (10), the class data being initialized according to the number of buffers of the service class allocated to the shared buffer; and a control circuit (4) for controlling inputs/outputs of said routing tag register, said address pointer register and said class data register, respectively.

Further, said routing tag register (1), said address pointer register (2) and said control circuit (4) for constituting each of a plurality of said address generating units (5) are connected to one another in such a way that data contents are stored in time serial manner beginning from the lowermost column side thereof.

Further, when a cell is inputted to or outputted from the shared buffer (10), said routing tag register (1) and said address pointer register (2) of said address generating unit (5) of the lowermost column including said class data register (3) for storing the class data the same as the class data of the inputted or outputted cell are selected and used.

Further, the service class is composed of a guaranteed traffic class including a constant bit rate and a variable bit rate, and a best effort traffic class including an available bit rate.

Further, a routing tag input bus (6) for transmitting a routing tag of each cell is connected to a plurality of said routing tag registers (1); and a write address for each cell in the shared buffer and a read address for each cell from the shared buffer are transferred to said address pointer registers (2), respectively.

Further, a control bus (7) is connected to said control circuits (4), and various control data are transmitted to each of said control circuits (4) through the control bus (7).

Further, in said routing tag register (1) and said address pointer register (2) of said selected and used address generating unit, when the lowermost columns thereof are allowed to be null, data stored in the columns over the null column are all shifted from columns to other columns arranged thereunder by one in sequence, respectively to fill the null columns.

Further, it is preferable that the address generating circuit further comprises multicasting means for copying an input cell and outputting the copied input cell to a plurality of output ports, respectively.

Further, said address generating unit (5) comprises an additional class data register (11) for setting a cell content on the basis of class data included in the cell, whenever the cell is inputted.

Further, said address generating unit (5) comprises an additional class data register (11) for storing a cell content on the basis of class data included in the cell, whenever the cell is inputted.

Further, said additional class data register (11) stores data indicative of a priority sequence of traffic types in a predetermined service class including a plurality of traffic types.

Further, said additional class data register (11) determines a priority between the constant bit rate and the variable bit rate of the guaranteed traffic class, when said class data register is allocated to the guaranteed traffic class.

Further, the present invention provides an address generating circuit of shared buffer type asynchronous transfer mode switch used for an asynchronous transfer mode switching system, which comprises: a plurality of address generating units (12), each for storing a routing tag indicative of an output port of each cell stored in a shared buffer (109), an address, class data indicative of a service class, and data indicative of priority sequence of traffic types in the service class, respectively; and wherein: when a cell is inputted to the shared buffer (10), a routing tag and an address stored in the address generating unit for storing the class data the same as the class data of the inputted cell are selected and used; and when a cell is outputted from the shared buffer (109), a routing tag and an address stored in the address generating unit for storing a priority sequence and the class data the same as the class data of the outputted cell are selected and used.

Further, the present invention provides an address generating circuit of shared buffer type asynchronous transfer mode switch used for an asynchronous transfer mode switching system, which comprises: a plurality of address generating units (12) each including: a routing tag resister (1) for storing a routing tag indicative of an output port of a cell inputted to and outputted from a shared buffer (109); an address pointer register (2) for storing address of a cell inputted to and outputted from the shared buffer; a first class data register (11), for storing data indicative of priority sequence of traffic types in a predetermined service class including a plurality of traffic types when the cell is inputted; a second data register (3) for storing class data indicative of the service class of the cell inputted to and outputted from the shared buffer, the class data being initialized according to the number of buffers of the service class allocated to the shared buffer; and a control circuit (4) for controlling inputs/outputs of the respective registers; and wherein: said routing tag register (1), said address pointer register (2), said first class data register (11) and said control circuit (4) for constituting each of a plurality of said address generating units (12) are connected to one another in such a way that data contents are stored in time serial manner beginning from the lowermost column side thereof; when a cell is inputted to the shared buffer (10), said routing tag register (1) and said address pointer register (2) of said address generating unit (12) of the lowermost column including said second class data register (3) for storing the class data the same as the class data of the inputted cell are selected and used; and when a cell is outputted from the shared buffer (10), said routing tag register (1) and said address pointer register (2) of said address generating unit (12) of the lowermost column including said first and second class data register (11, 3) for storing the priority data and the class data the same as the class data of the outputted cell are selected and used.

BRIEF DESCRIPTION OF THE DRAWINGS

FIG. 19 is a view showing the internal states of the address generating circuit and the cell buffers obtained when the cell B has been outputted from the internal states shown in FIG. 18;

FIG. 20 is a view showing the internal states of the address generating circuit and the cell buffers obtained when one has been shifted from the internal states shown in FIG. 19;

DETAILED DESCRIPTION OF THE PREFERRED EMBODIMENTS

Figure 1A:
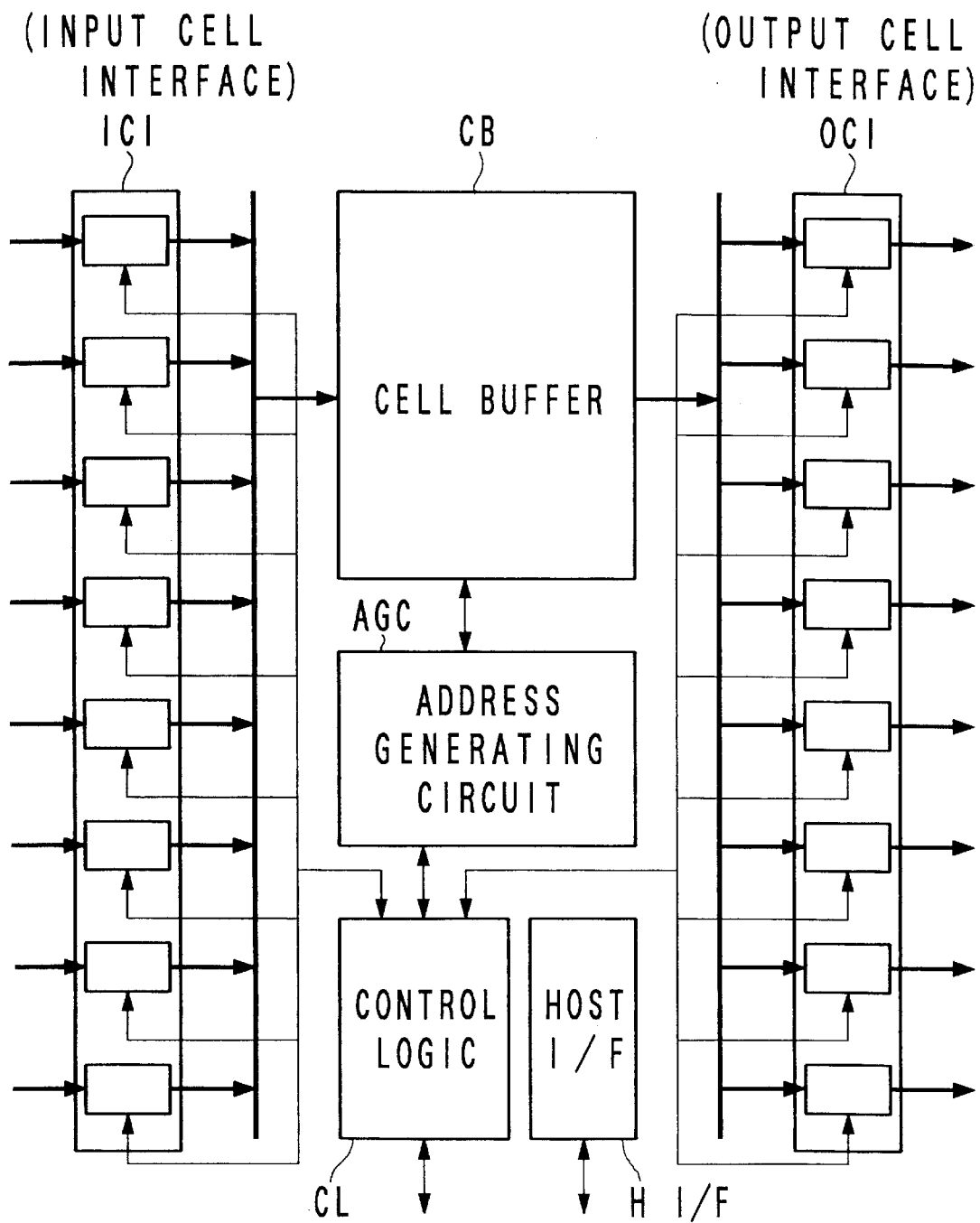
FIG. 1A is a circuit diagram showing an embodiment of shared buffer type ATM switch according to the present invention.

FIG. 1A shows a shared buffer type ATM switch having ICI (Input Cell Interface), CB (Cell Buffer), AGC (Address Generating Circuit), CL (Control Logic), H I/F (Host I/F) and OCI (Output Cell Interface).

An embodiment of the address generating circuit (AGC) for an ATM (asynchronous transfer mode) switch according to the present invention will be described hereinbelow with reference to the attached drawings.

Figure 1B:
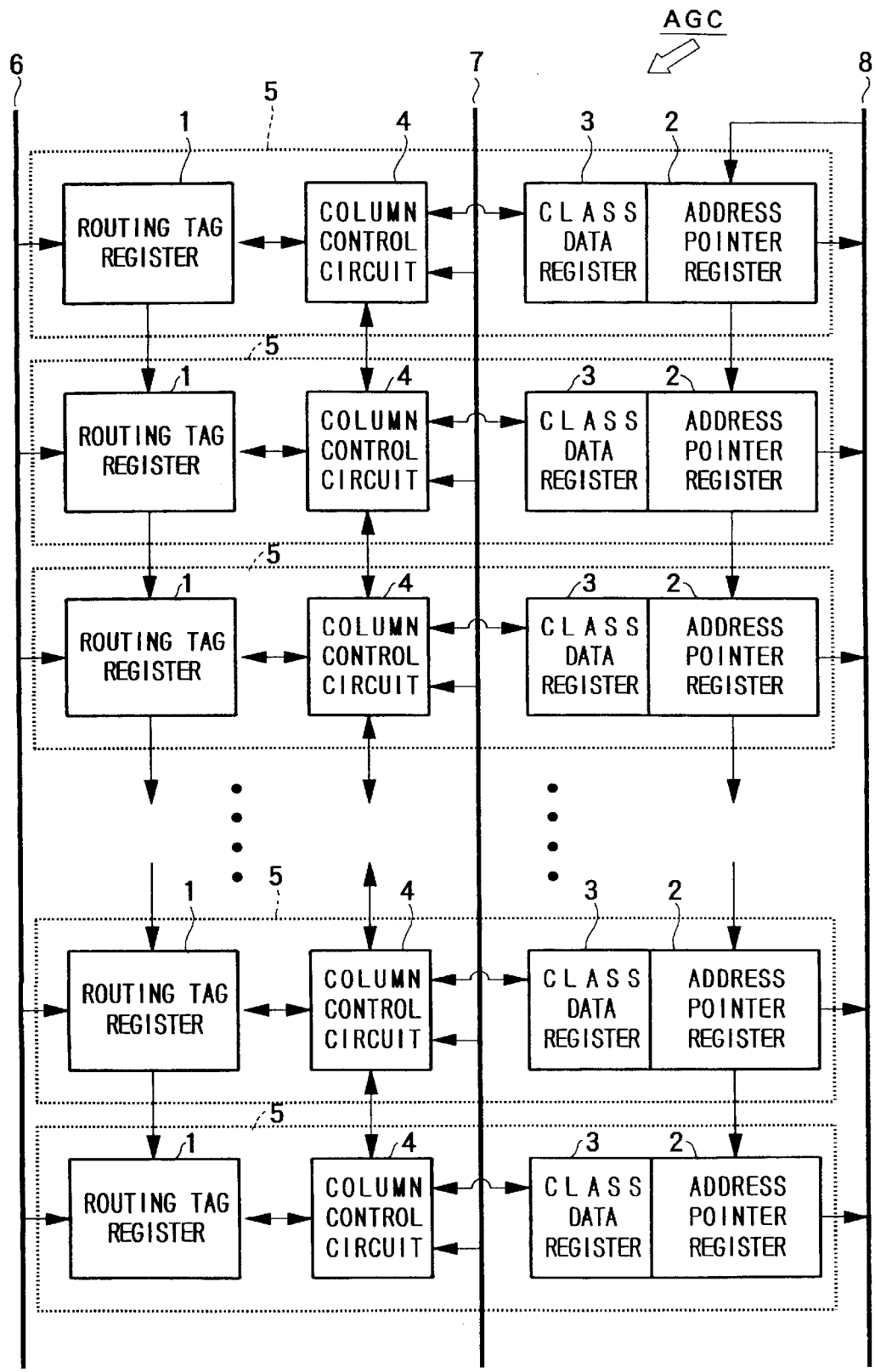
FIG. 1B is a circuit diagram showing an embodiment of the address generating circuit of an ATM switch according to the present invention.

FIG. 1B is a circuit diagram showing the embodiment thereof. In FIG. 1B, the address generating circuit (AGC) is composed of a plurality of address generating units 5 each connected in a loop state through a routing tag (i.e., destination data) input bus 6, a control bus 7, and an address pointer output bus 8 each corresponding to each address generating unit 5. Further, each address generating unit 5 is composed of a routing tag register 1, an address pointer register 2, a class data register 3, and a column control circuit 4.

The routing tag register 1 stores a routing tag of each data cell; the address pointer register 2 stores an address of each data cell stored in a cell buffer (not shown in FIG. 1B); the class data register 3 stores a service class of each data cell; and the column control circuit 4 controls all of these registers.

At initialization, values are set to the class data registers 3 in correspondence to the number of the cell buffers allocated for each service class. For instance, in the case where the cell buffers are required to be fixedly divided into two service classes of a G (guaranteed traffic) class having CBR and rt-VBR and a B (best effort traffic) class having nrt-VBR, ABR and UBR, an entry of "1" is set to each of the class data registers 3 corresponding to the cell buffers allocated to the B class, and an entry of "0" is set to each of the class data registers 3 corresponding to the cell buffers allocated to the G class, respectively. Further, here, CBR denotes a constant bit rate, rt-VBR denotes a real time variable bit rate, nrt-VBR denotes a non-real time variable bit rate, ABR denotes an available bit rate and UBR denotes unspecified bit rate, respectively.

The cell routing tags are transferred to the routing tag input bus 6 through a switch input section (not shown). Further, control data for the address generating circuit are transferred to the control bus 7. Further, write and read addresses in and from the cell buffers are transferred to the address pointer output bus 8, respectively. Here, the positional relationship (not the physical positions) of the respective address generating units 5 corresponds to the arrival sequence of the cells. Therefore, in the same service class, the arrival times of the cells corresponding to the address generating units 5 positioned on the lower side (lower order) are earlier than the arrival times of the cells corresponding to the address generating units 5 positioned on the upper side (higher order) in FIG. 1.

In the different service classes, on the other hand, the cells corresponding to the lower-order address generating units 5 are not necessarily earlier in arrival time than the cells corresponding to the higher-order address generating units 5. However, when the priority control is executed between two service classes, the cells of higher priority (even if the arrival sequence thereof is latter) can be outputted over the cells of lower priority. Accordingly, the time sequence is important only within the same service class, and the reversal of the time sequence between the two different service classes causes no trouble.

The address generating circuit as described above functions on the basis of three (input, output and shift) operations as follows:

In the input operation, data cells are inputted. In the input operation, a routing tag and class data each attached to a data cell are transferred to the address generating circuit 9, and vacant columns of the corresponding class of the address generating circuit 9 are searched beginning from the lower-order side. The routing tag is inputted to the first-searched vacant column of the corresponding class. Further, the address pointer value of the column is transferred to the cell buffer to write the transferred cell in the cell buffer.

Figure 2:
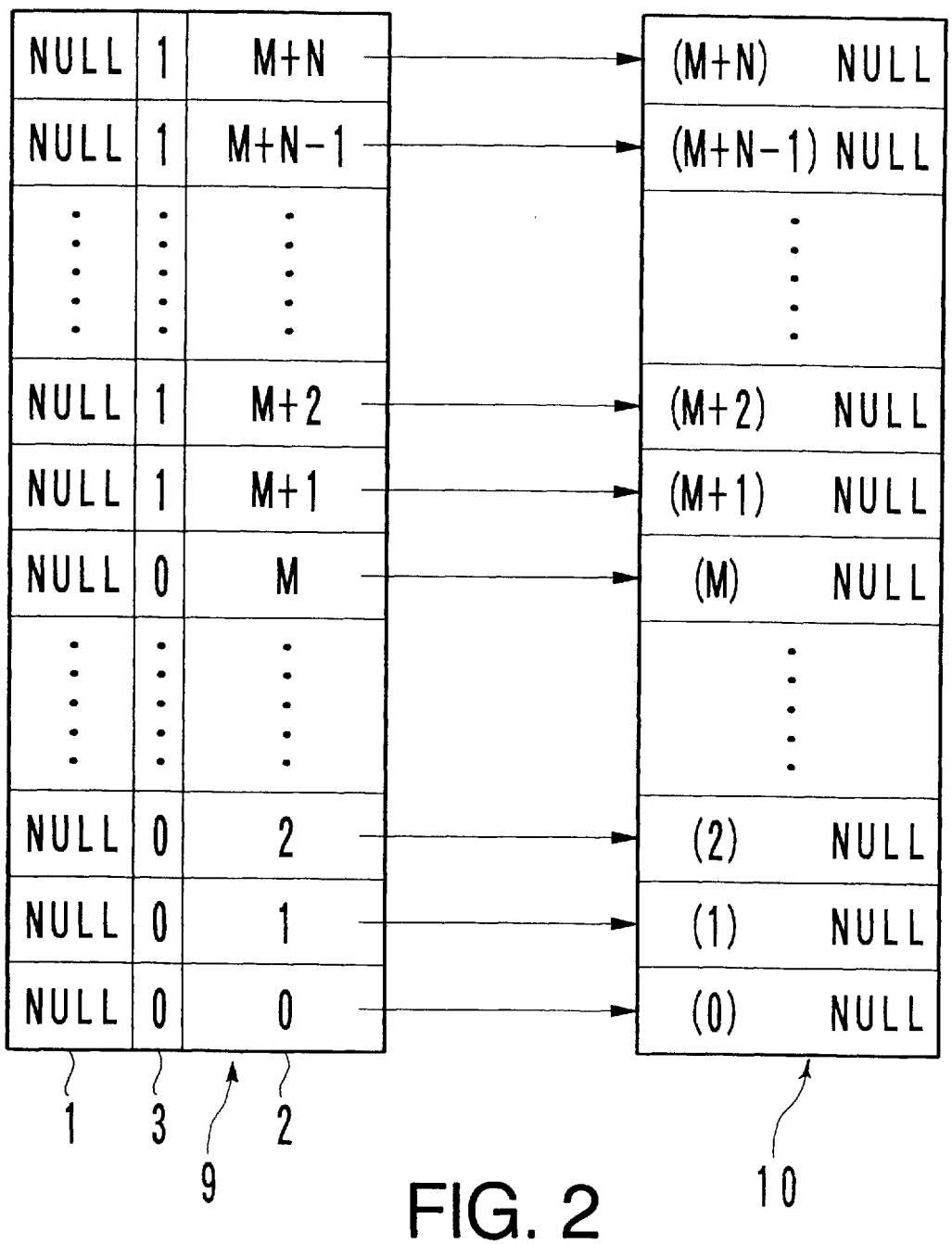
FIG. 2 is a view showing initial internal states of an address generating circuit shown in FIG. 1B and cell buffers.
Figure 3:
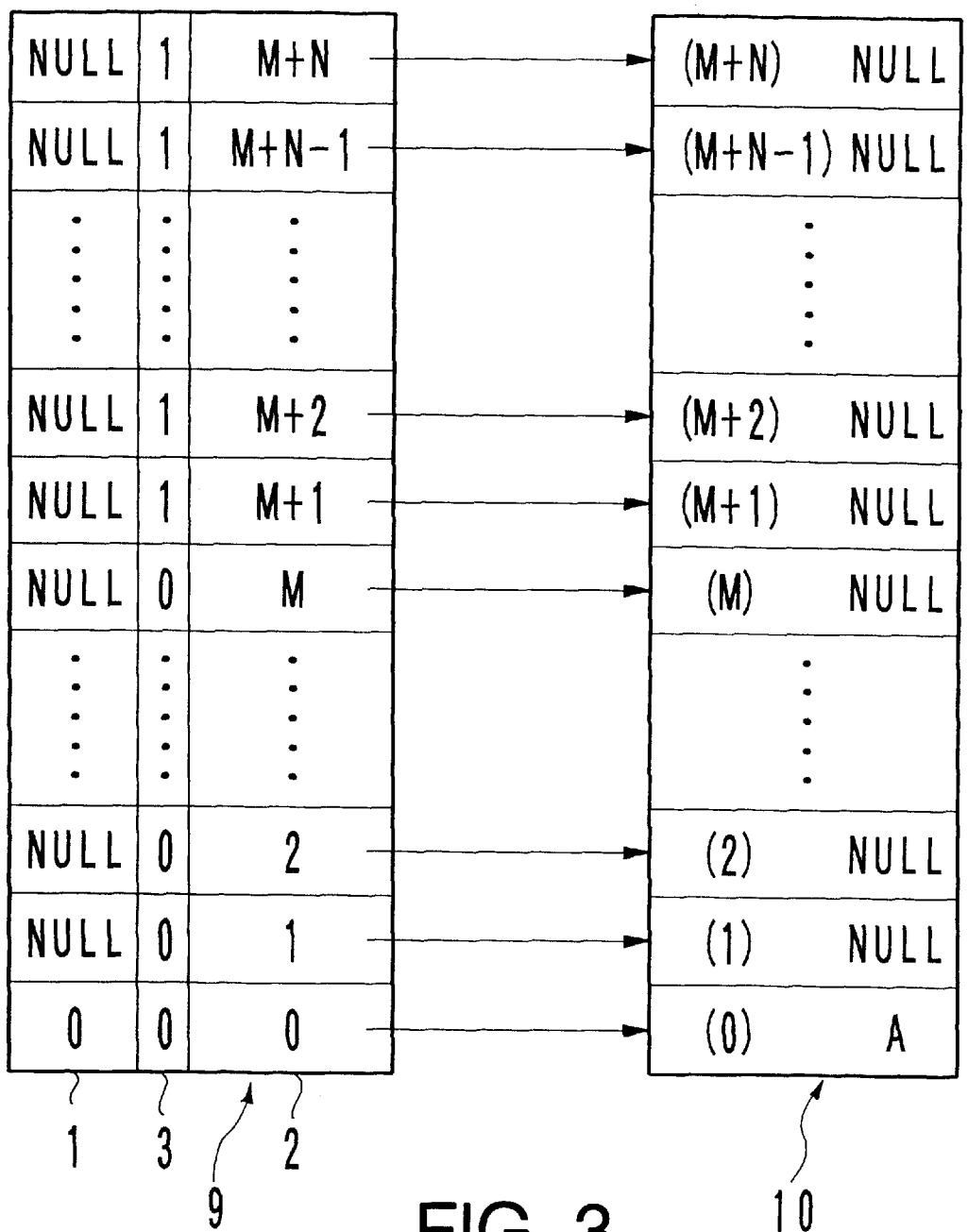
FIG. 3 is a view showing the internal states of the address generating circuit and the cell buffers obtained when a cell A has been inputted from the initial states shown in FIG. 2.
Figure 4:
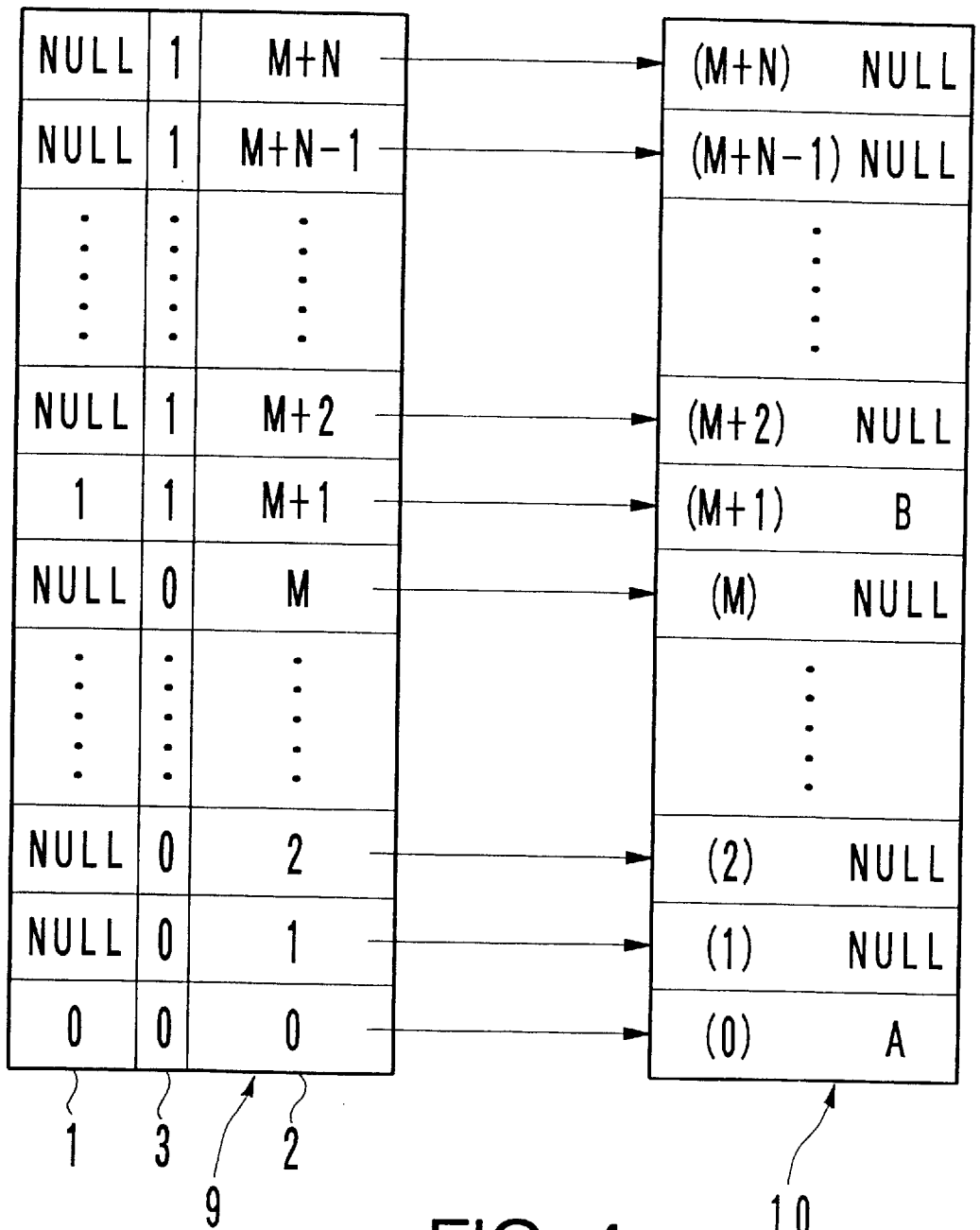
FIG. 4 is a view showing the internal states of the address generating circuit and the cell buffers obtained when a cell B has been inputted from the internal states shown in FIG. 3.
Figure 5:
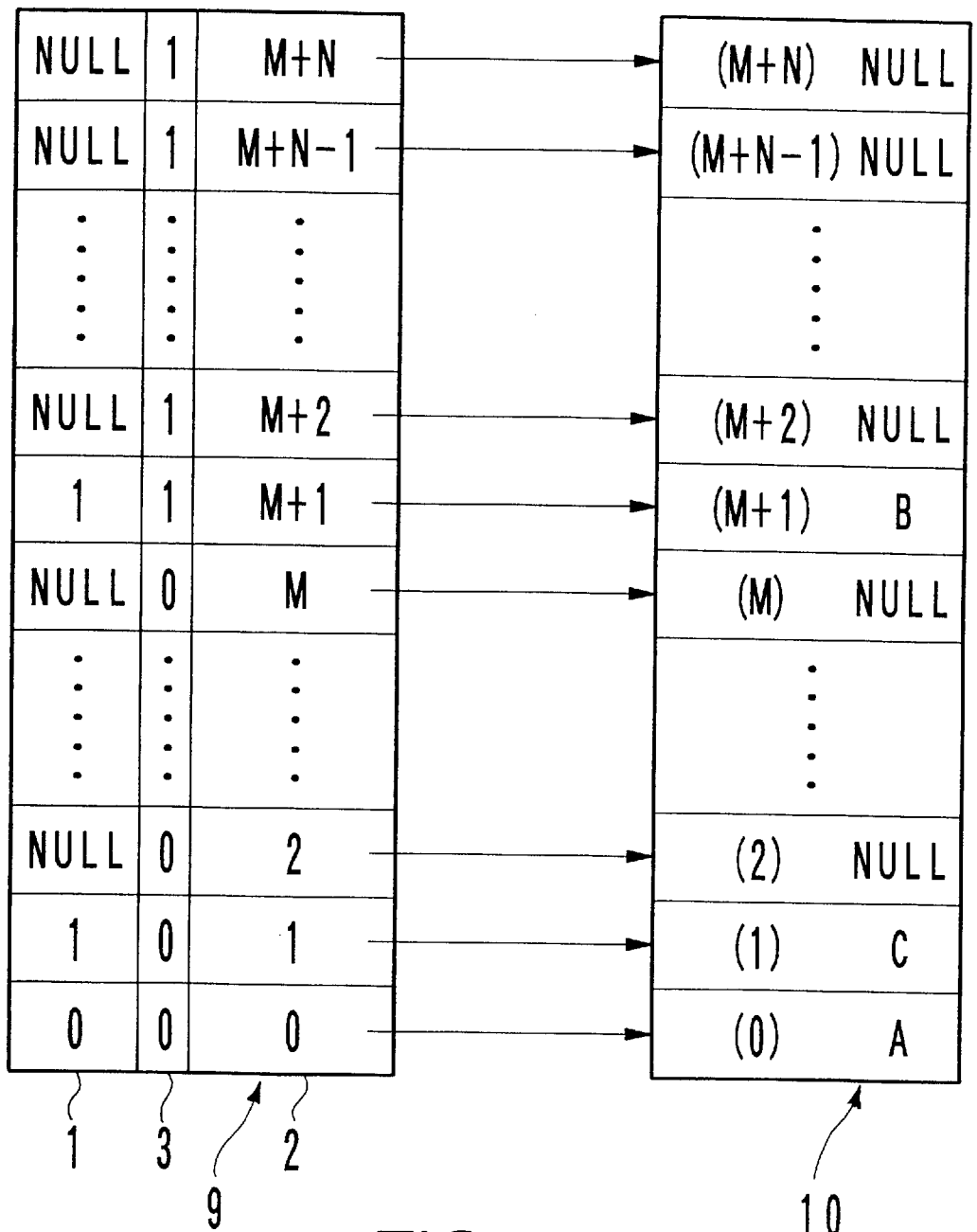
FIG. 5 is a view showing the internal states of the address generating circuit and the cell buffers obtained when a cell C has been inputted from the internal states shown in FIG. 4.

FIG. 2 shows the initial internal states of the address generating circuit 9 and the cell buffers 10. FIG. 3 shows the internal states of the address generating circuit 9 and the cell buffers 10 obtained when a cell A having the routing tag 0 and the class G has been inputted from the internal states shown in FIG. 2; FIG. 4 shows the internal states of both obtained when a cell B having the routing tag 1 and the class B has been inputted from the internal states shown in FIG. 3; FIG. 5 shows the internal states of both obtained when a cell C having the routing tag 1 and the class G has been inputted from the internal states shown in FIG. 4; and FIG. 6 shows the internal states of both obtained when a cell D having the routing tag 0 and the class B has been inputted from the internal states shown in FIG. 5.

In the output operation, data cells are outputted. In the output operation, the columns of the address generating circuit 9 which have the routing tag and the class data corresponding to the output port and the output class, respectively are searched beginning from the lower-order side. An address pointer value of the first-searched column is transferred to the cell buffer 10, to read the data cell from the corresponding cell buffer 10. Further, the routing tag of the column from which the data cell has been outputted is reset.

Figure 6:
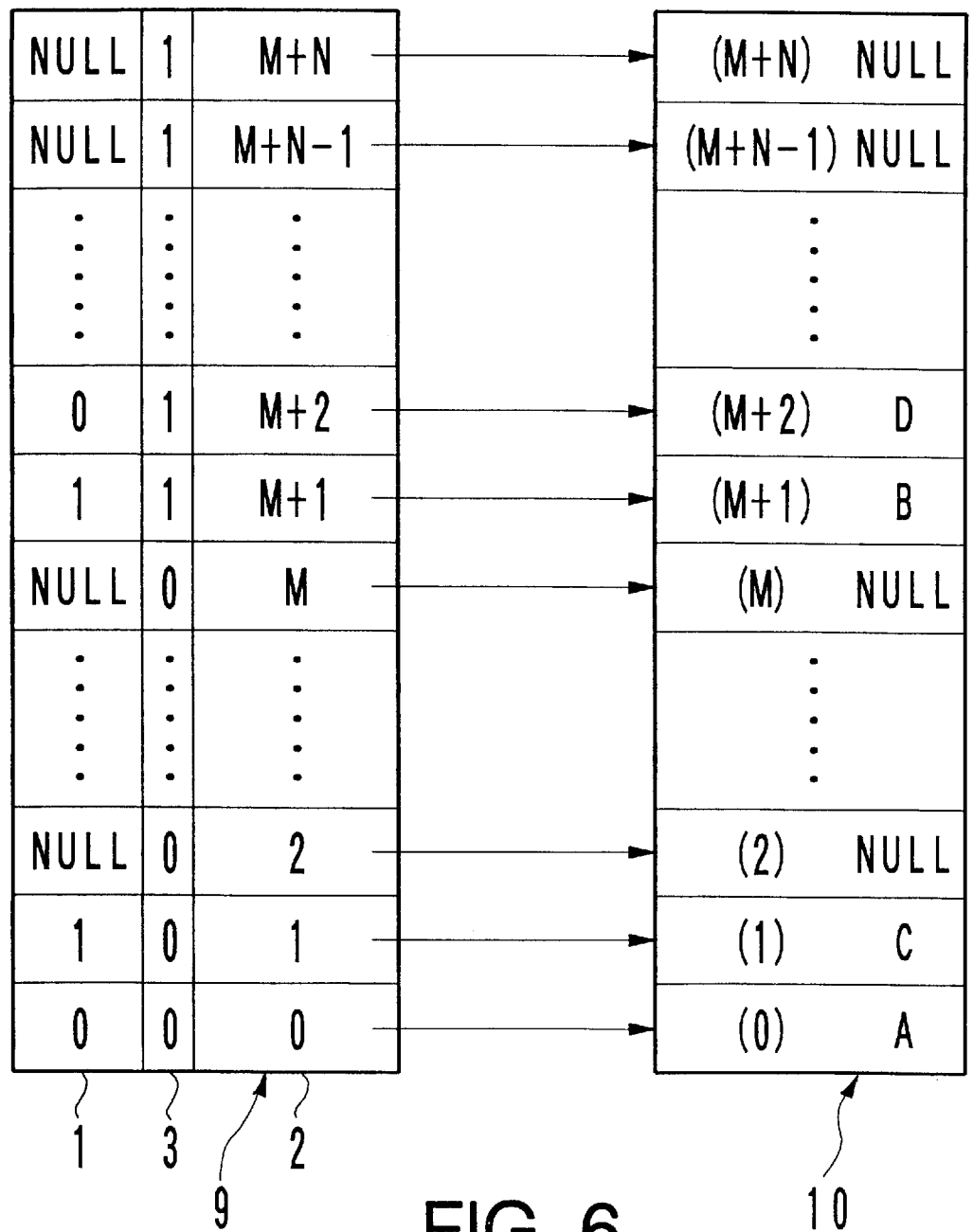
FIG. 6 is a view showing the internal states of the address generating circuit and the cell buffers obtained when a cell D has been inputted from the internal states shown in FIG. 5.
Figure 7:
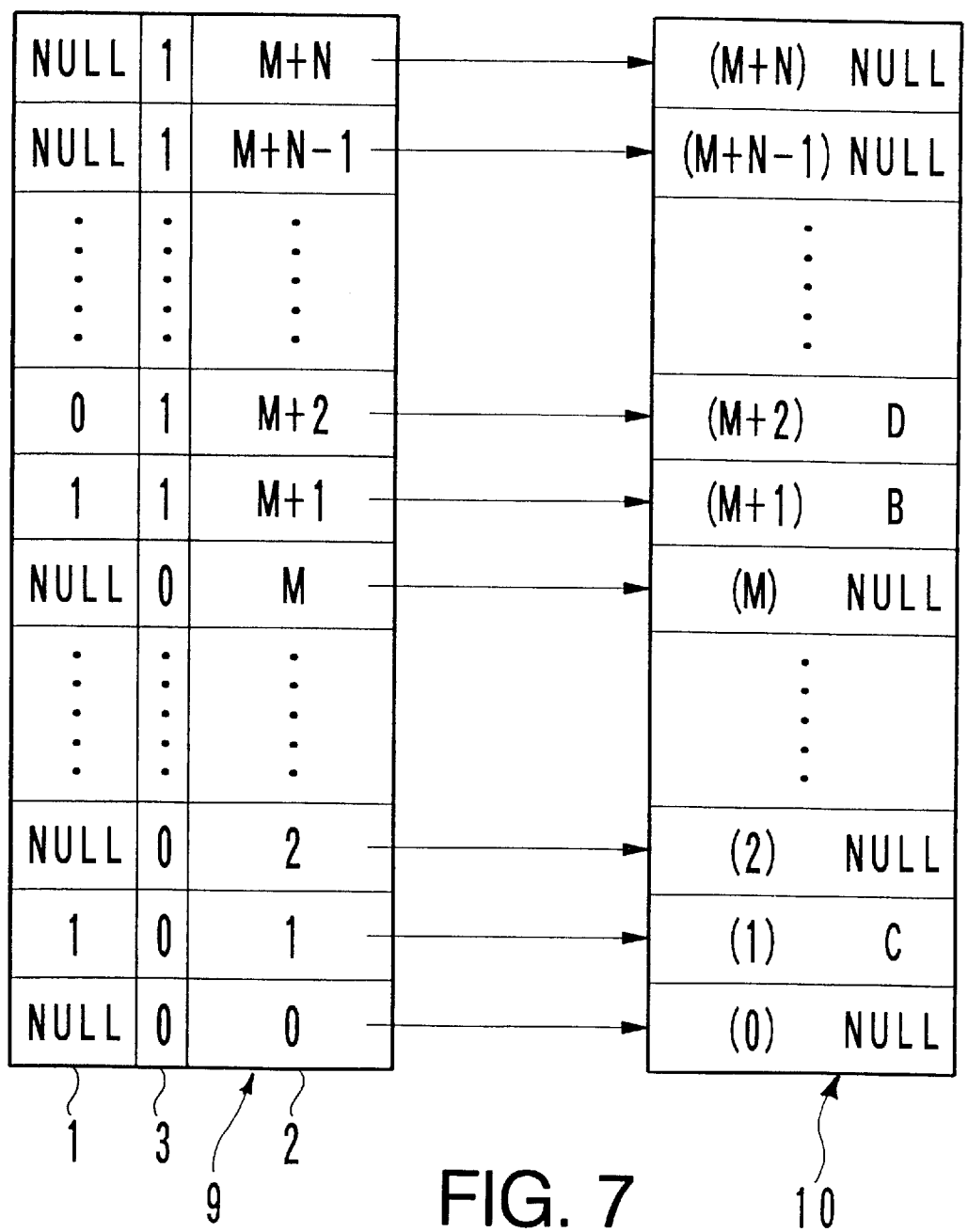
FIG. 7 is a view showing the internal states of the address generating circuit and the cell buffers obtained when the cell A has been outputted from the internal states shown in FIG. 6.
Figure 8:
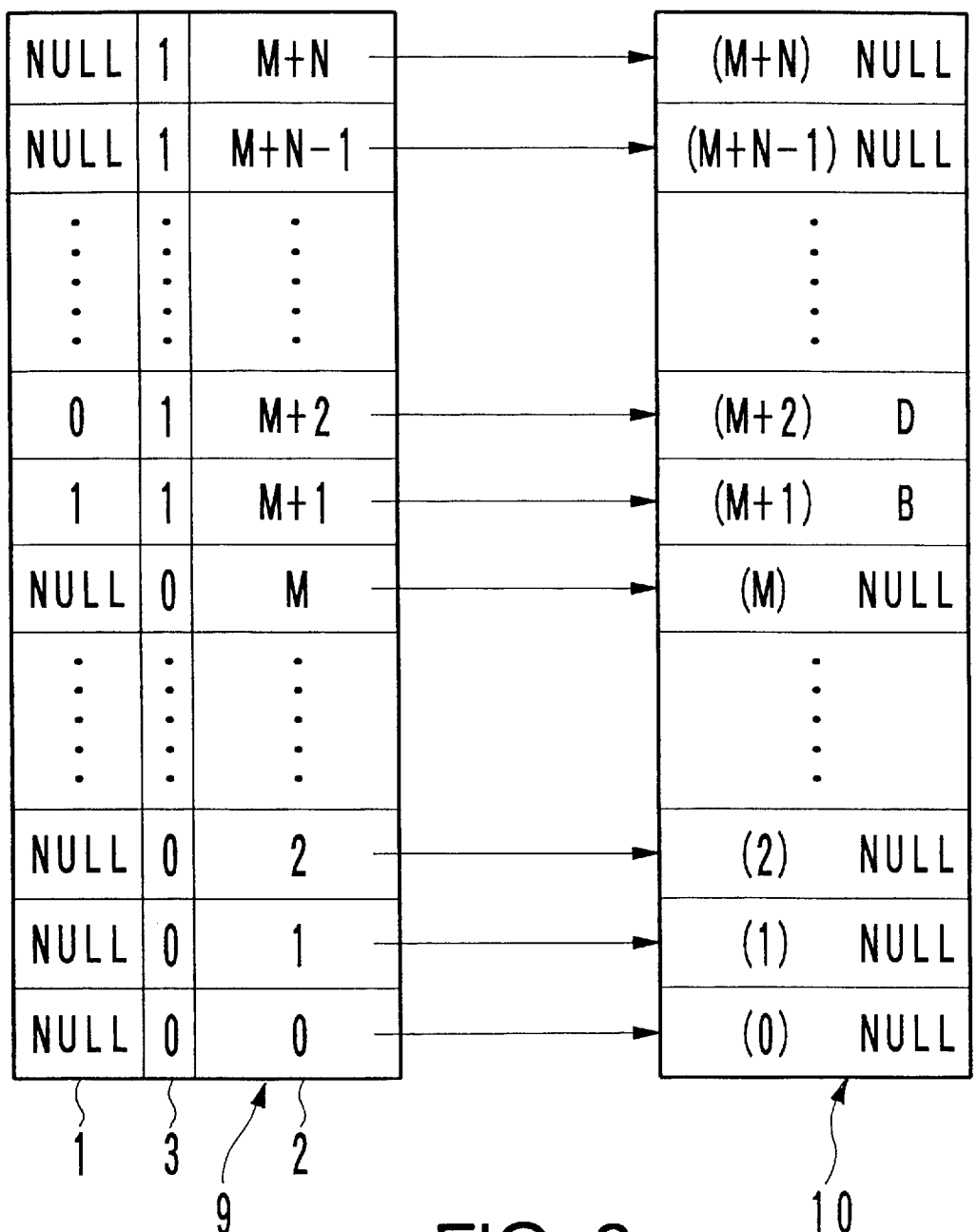
FIG. 8 is a view showing the internal states of the address generating circuit and the cell buffers obtained when the cell C has been outputted from the internal states shown in FIG. 7.

FIG. 7 shows the internal states of the address generating circuit 9 and the cell buffers 10 obtained when the cell A having the class G to be transmitted to an output port "0" (the routing tag 0) has been outputted from the internal states shown in FIG. 6; and FIG. 8 shows the internal states of both obtained when the cell C having the class G to be transmitted to an output port "1" (the routing tag 1) has been outputted from the internal states shown in FIG. 7. Further, the columns from which the data cells have been outputted are changed to vacant columns, respectively.

In the shift operation, data cells are shifted in sequence to fill the vacant columns caused by the output operation. In the shift operation, the vacant columns of the address generating circuit 9 are searched beginning from the lower-order side together with the class data. The class data and the address pointer value of the first-searched vacant column are transferred to the address pointer output bus 8, and further the column values just over the first-searched column are shifted to a one-stage lower column. Further, the class data and the address pointer value both outputted to the address pointer output bus 8 are inputted to the uppermost stage column.

Figure 9:
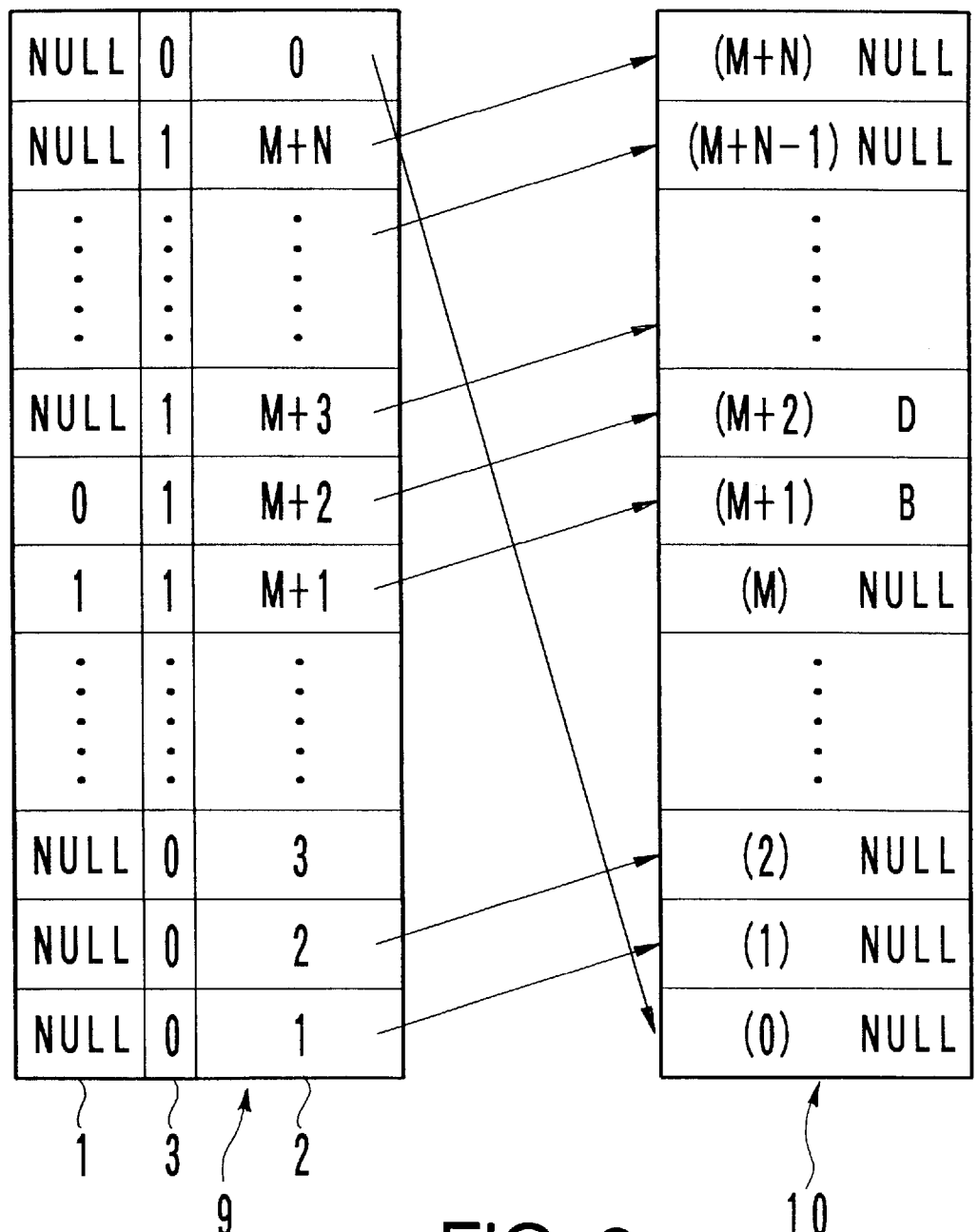
FIG. 9 is a view showing the internal states of the address generating circuit and the cell buffers obtained when one cell has been shifted from the internal states shown in FIG. 8.
Figure 10:
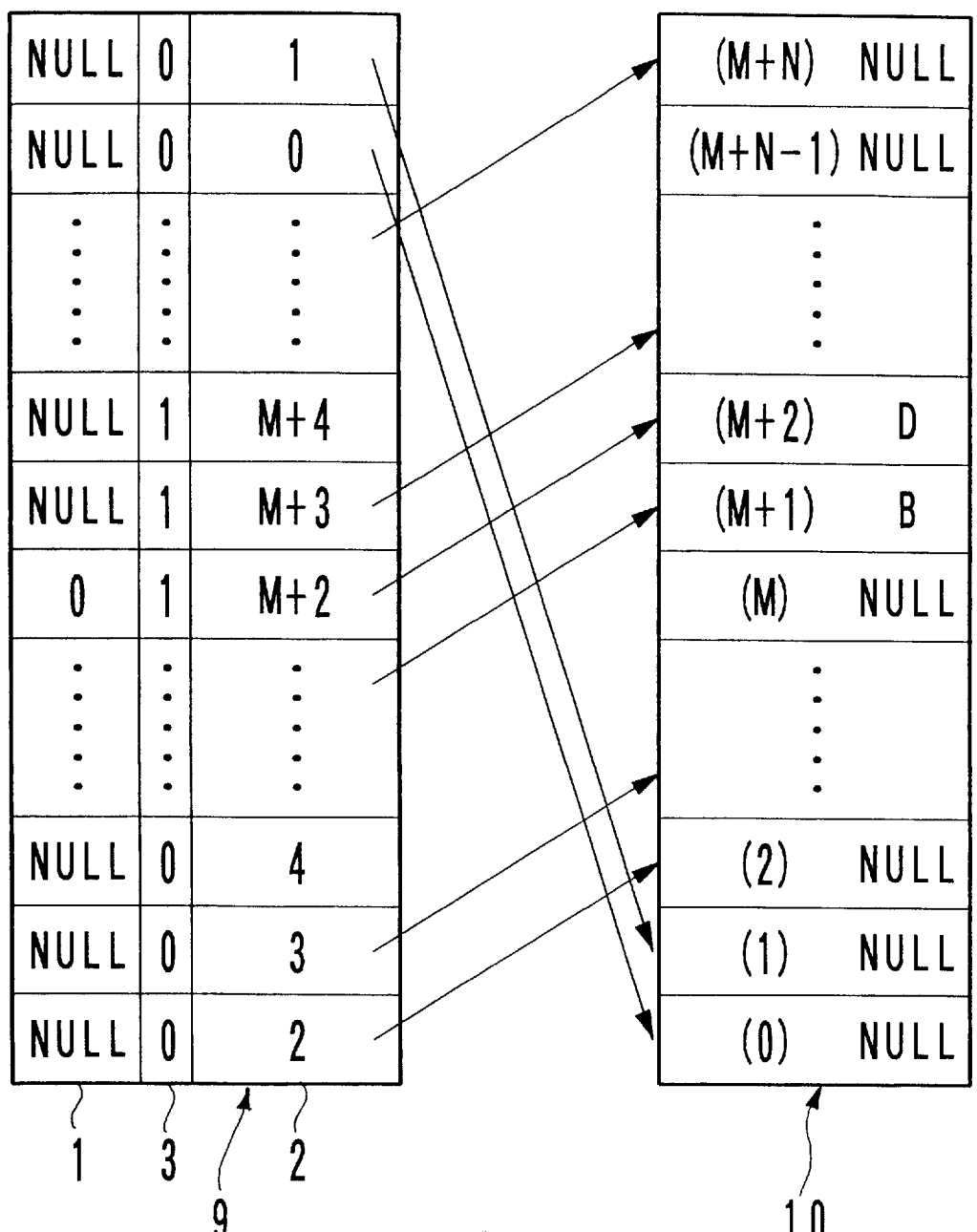
FIG. 10 is a view showing the internal states of the address generating circuit and the cell buffers obtained when another cell has been further shifted from the internal states shown in FIG. 9.

FIG. 9 shows the internal states of the address generating circuit 9 and the cell buffers 10 obtained when the shift operation has been executed once from the internal states shown in FIG. 8, so that one vacant column is filled with cell data. Further, FIG. 10 shows the internal states of the address generating circuit 9 and the cell buffers 10 obtained when the shift operation has been further executed once from the internal states shown in FIG. 9, so that one vacant column is further filled with cell data.

Further, in the above-mentioned address generating circuit, the multicasting function (the input cells are copied and then outputted to a plurality of output ports) can be realized easily by preparing a plurality of the routing tag registers 1 whose number is the same as that of the output ports.

Figure 11:
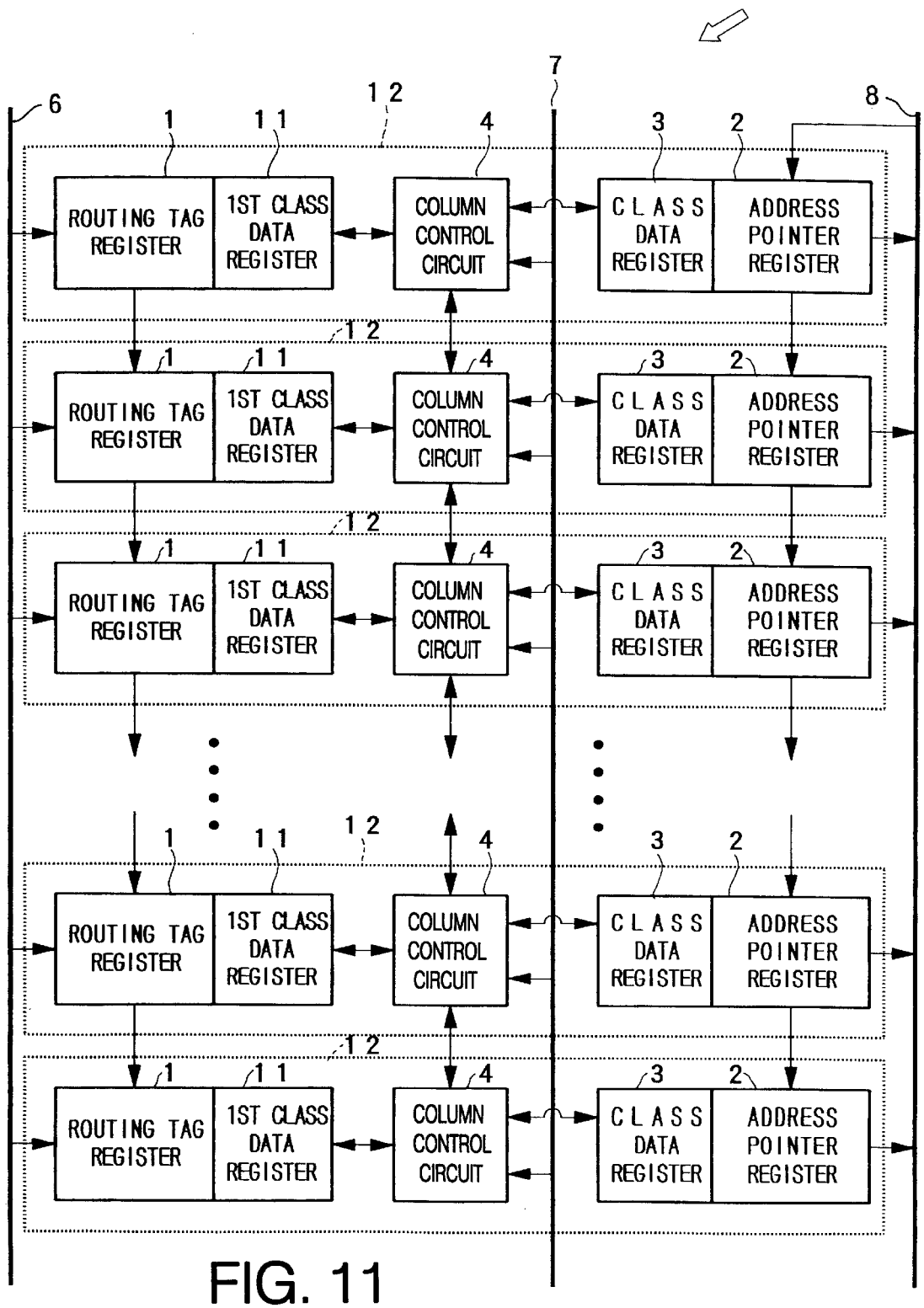
FIG. 11 is a circuit diagram showing a modification of the address generating circuit for an ATM switch according to the present invention.
Figure 12:
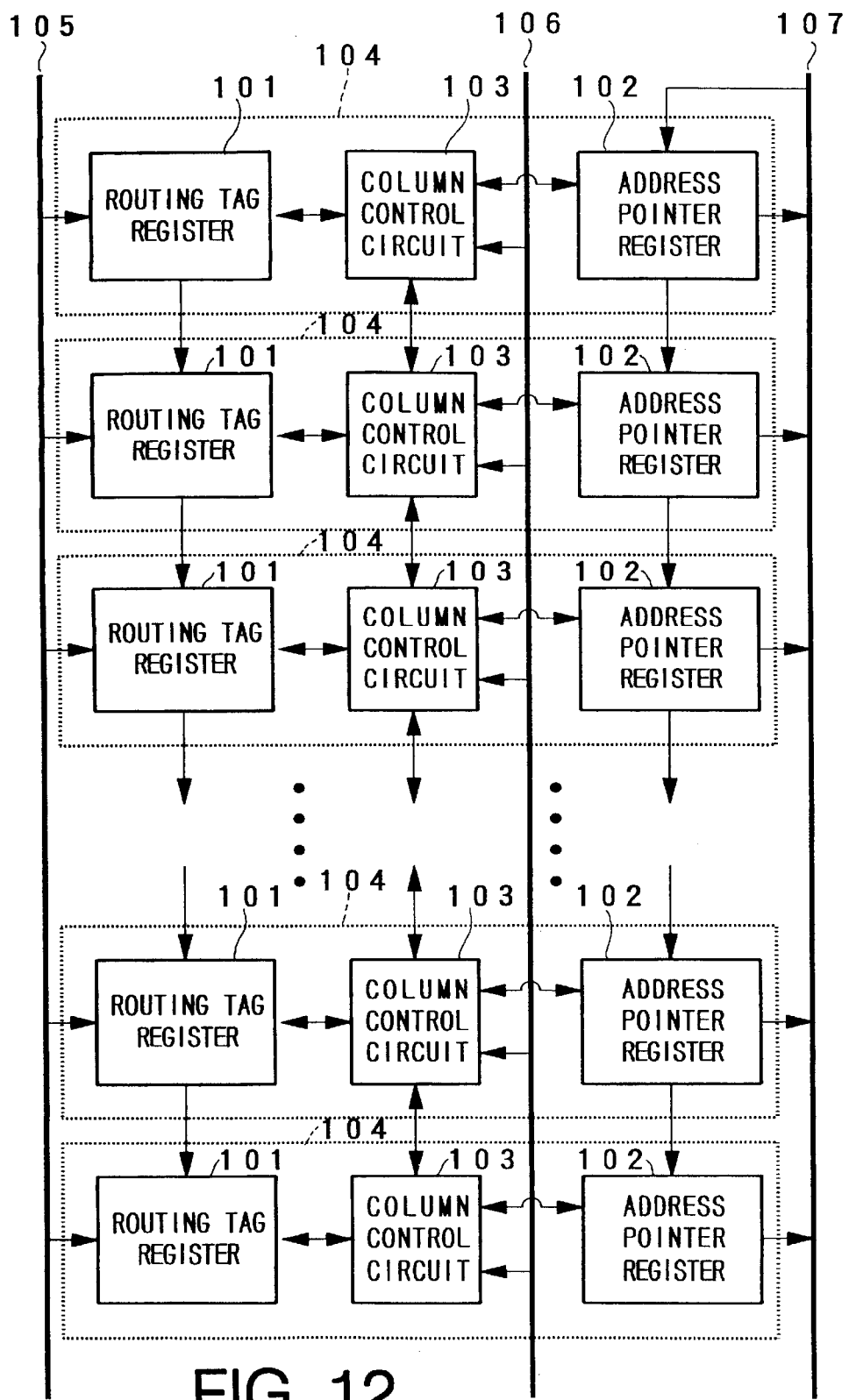
FIG. 12 is a circuit diagram showing a prior art address generating circuit of an ATM switch.
Figure 13:
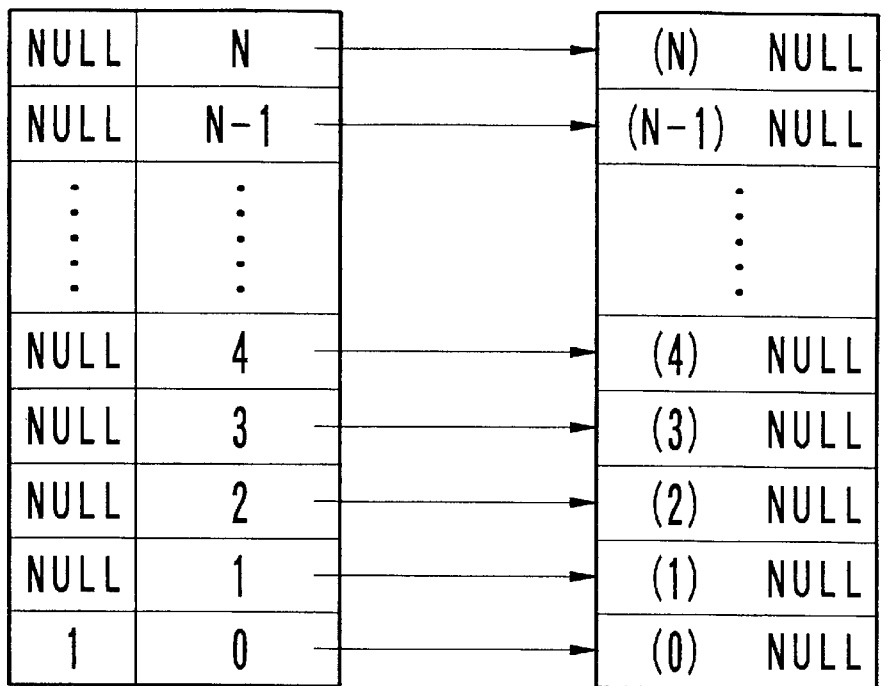
FIG. 13 is a view showing initial internal states of an address generating circuit shown in FIG. 12 and cell buffers.
Figure 14:
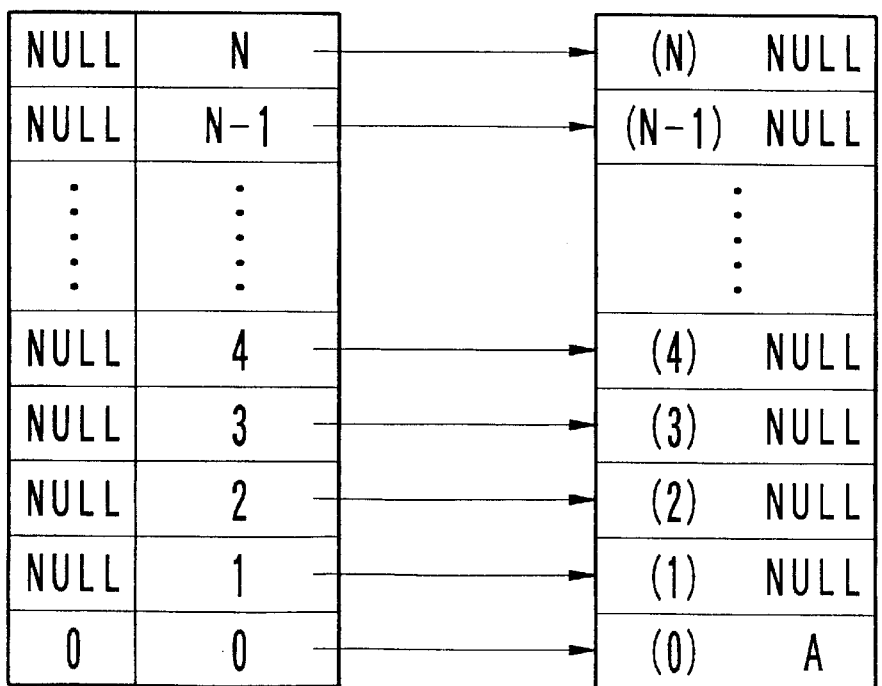
FIG. 14 is a view showing the internal states of the address generating circuit and the cell buffers obtained when a cell A has been inputted from the initial states shown in FIG. 13.
Figure 15:
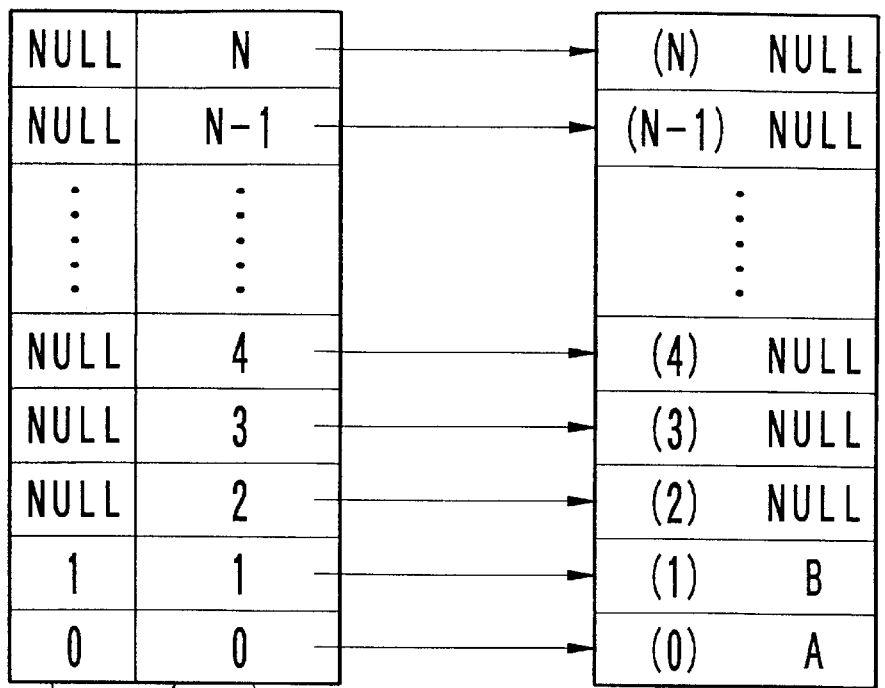
FIG. 15 is a view showing the internal states of the address generating circuit and the cell buffers obtained when a cell B has been inputted from the internal states shown in FIG. 14.
Figure 16:
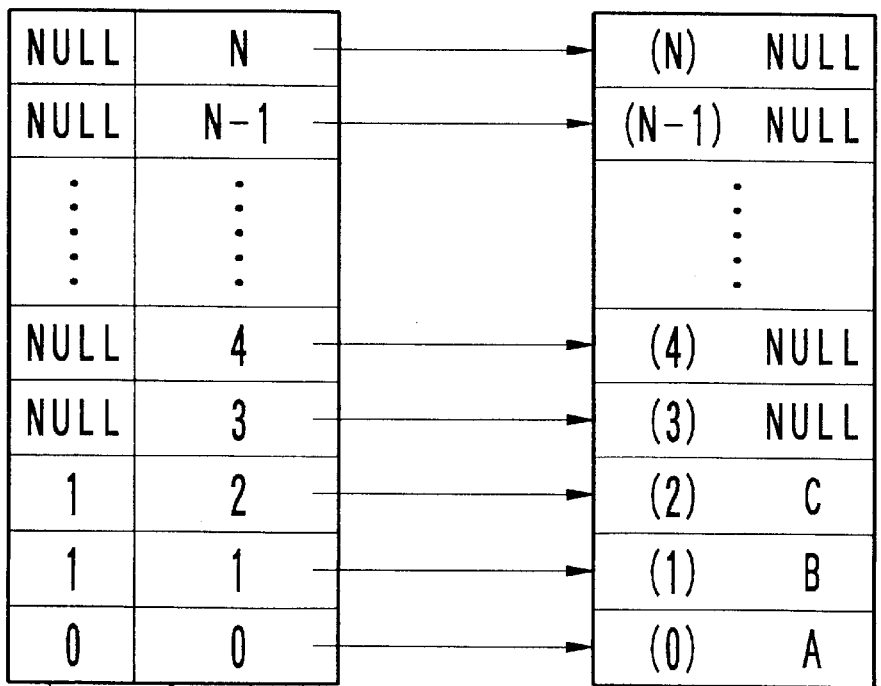
FIG. 16 is a view showing the internal states of the address generating circuit and the cell buffers obtained when a cell C has been inputted from the internal states shown in FIG. 15.
Figure 17:
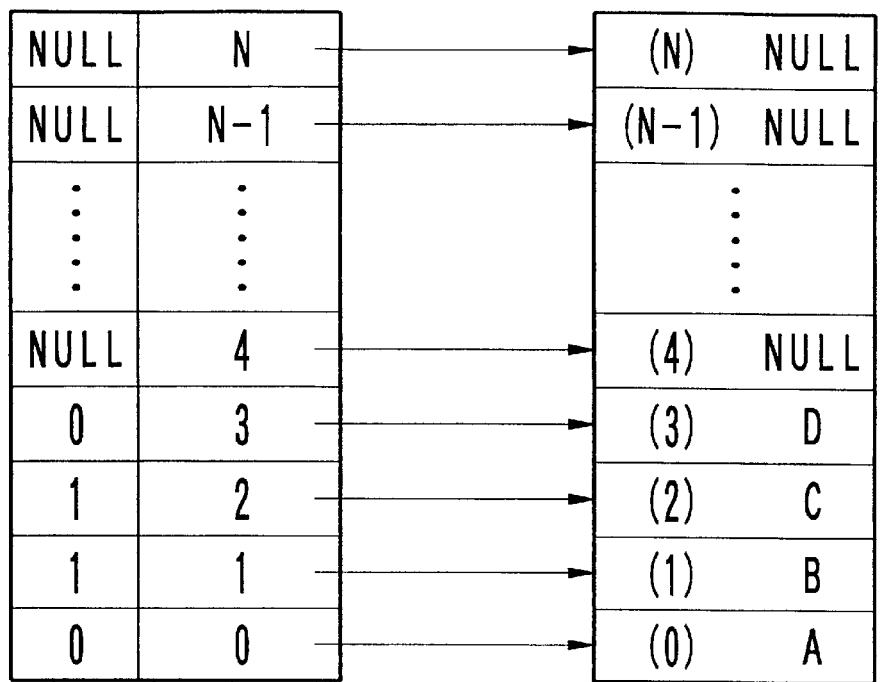
FIG. 17 is a view showing the internal states of the address generating circuit and the cell buffers obtained when a cell D has been inputted from the internal states shown in FIG. 16.
Figure 18:
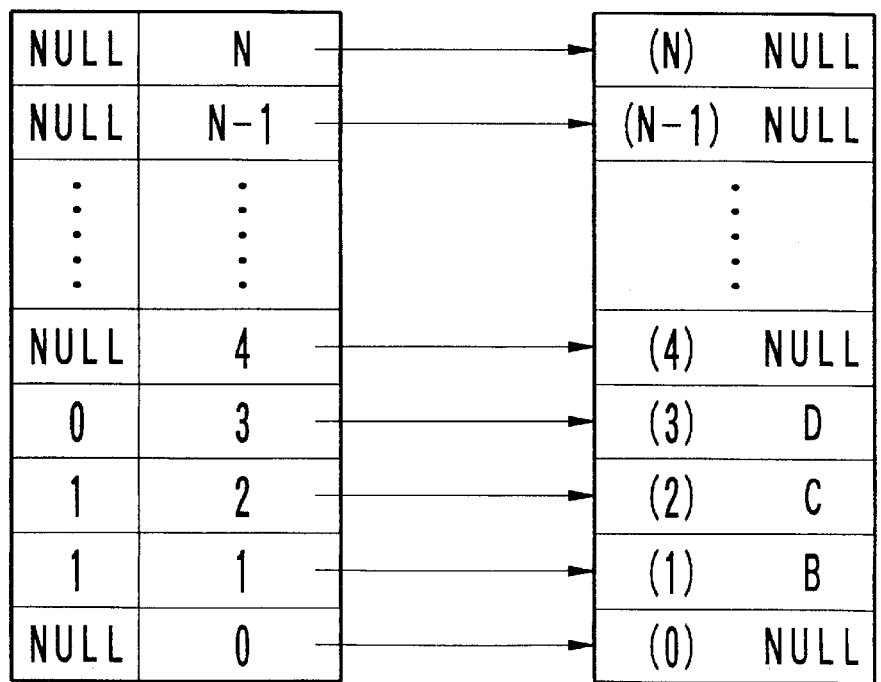
FIG. 18 is a view showing the internal states of the address generating circuit and the cell buffers obtained when the cell A has been outputted from the internal states shown in FIG. 17.
Figure 21:
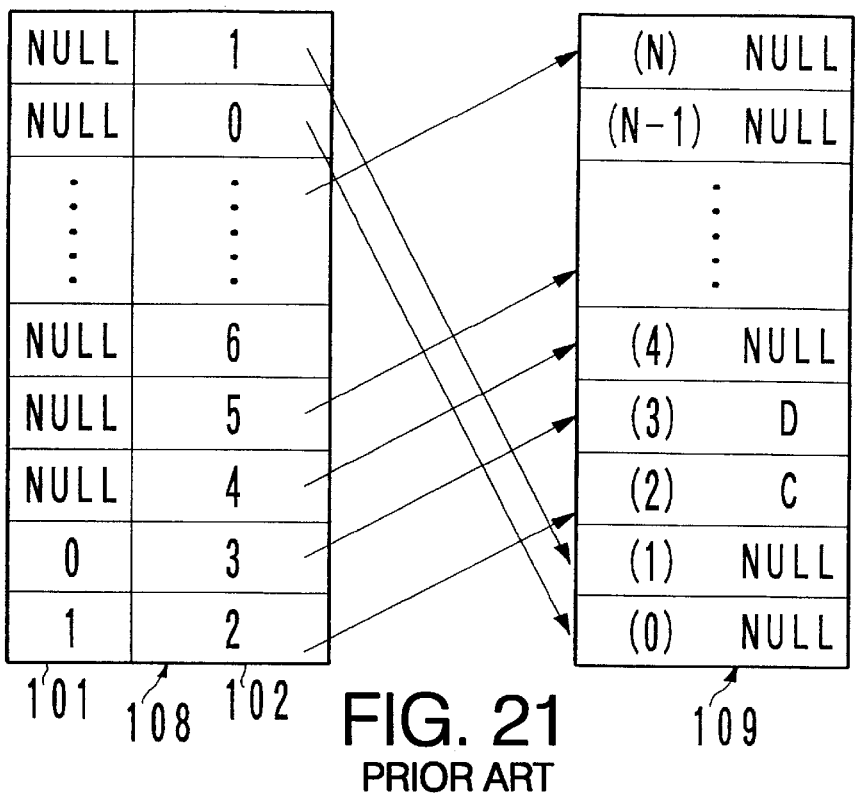
FIG. 21 is a view showing the internal states of the address generating circuit and the cell buffers obtained when another cell has been further shifted from the internal states shown in FIG. 20.
Figure 22:
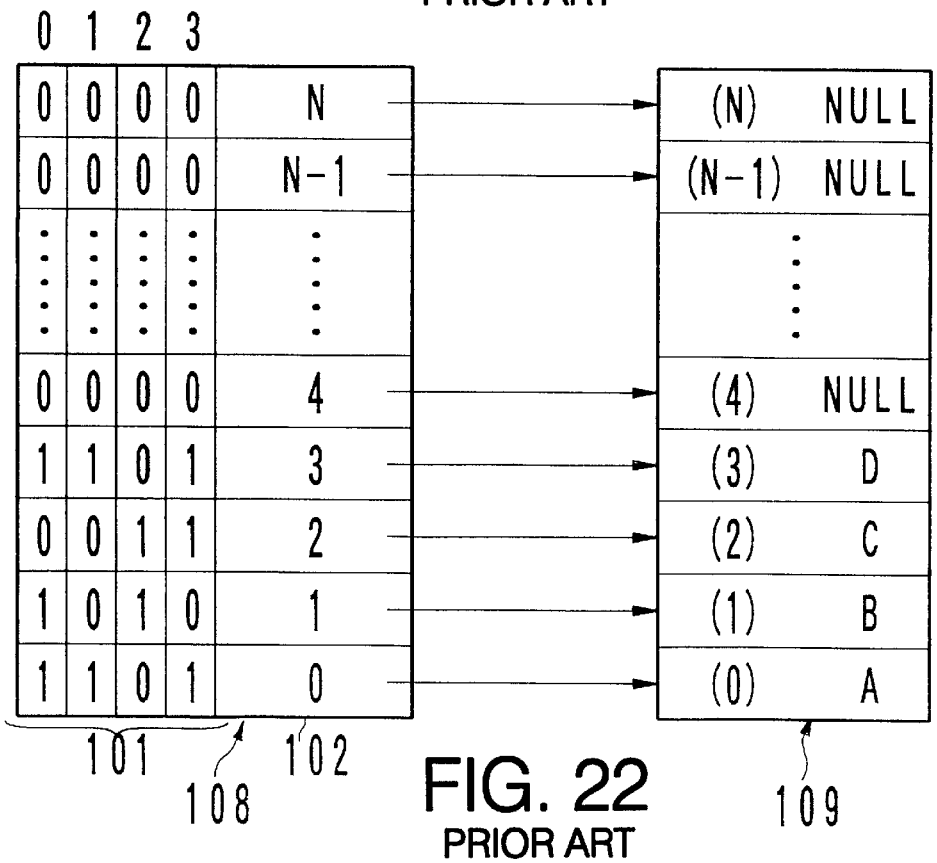
FIG. 22 is a circuit diagram showing a prior art address generating circuit and the cell buffers for an ATM switch provided with a multicasting function.

FIG. 11 is a circuit diagram showing a modification of the ATM switch address generating circuit according to the present invention. In comparison with the address generating circuit as shown in FIG. 1B, the feature of this modification is that the class data are stored being divided into a first class data register 11 and a second class register 3 respectively, without changing the construction thereof other than the above.

The first class data registers 11 are set on the basis of the class data added to the cells in the cell input operation. On the other hand, the second class registers 3 are the same as the class data registers 3 shown in FIG. 1B. At initialization, values are set to the class data registers in correspondence to the number of the cell buffers allocated for each service class. For instance, in the case where the cell buffers are required to be fixedly divided into two service classes of a G (guaranteed traffic) class having CBR and VBR and a B (best effort traffic) class having ABR, an entry of "1" is set to each of the second class data registers 3 corresponding to the cell buffers allocated to the G class, and an entry of "0" is set to each of the second class data registers 3 corresponding to the cell buffers allocated to the B class, respectively.

Further, the cell buffers allocated to the G class share both CBR and VBR. In this case, when both the bit rates are required to be handled with priority between both, "1" is set to each of the first class data registers 11 in the case of CBR and "0" is set to each of the first class data registers 11 in the case of VBR, respectively, for instance on the basis of the class data of the inputted cells.

The address generating circuit as described above functions on the basis of three (input, output and shift) operations as follows:

In the input operation, data cells are inputted. In the input operation, the routing tag and the class data each attached to each data cell are transferred to the address generating circuit, and vacant columns of the corresponding class (B or G) of the address generating circuit are searched beginning from the lower-order side. The routing tag is inputted to the first-searched vacant column of the corresponding class (B or G), and the class data (CBR or VBR) is inputted to the first class data register 11. Further, the address pointer value of the column is transferred to the cell buffer to write the transferred cell in the cell buffer.

In the output operation, data cells are outputted. In the output operation, the columns of the address generating circuit, which have the routing tag and the class data both matching the output port and the output class (CBR, VBR or ABR), are searched beginning from the lower-order side. The address pointer value of the first-searched column is transferred to the cell buffer, to read a data cell from the corresponding cell buffer. Further, the routing tag of the column from which the cell has been outputted is reset. The column from which the cell has been outputted is changed to a vacant column.

In the shift operation, cells are shifted to fill the vacant columns caused by the output operation. In the shift operation, the vacant columns of the address generating circuit are searched beginning from the lower-order side together with the class data (B or G). The class data (B or G) and the address pointer value of the first-searched vacant column are transferred to the address pointer output bus, and further the column values just over the searched column are shifted to a one-stage lower column. Further, the class data (B or G) and the address pointer value both outputted to the address pointer output bus are inputted to the uppermost stage column.

As described above, in the address generating circuit of the shared buffer type ATM switch for an ATM switch system according to the present invention, it is possible to simultaneously realize two facts such that the cell buffers can be fixedly divided (hard partition) into a plurality of service classes and further such that the cell buffers can be shared (soft partition) although priority control is executed in a part of the service class.

Further, when means for storing the class data indicative of the service classes is provided, it is possible to support a plurality of service classes by use of only a single switch LSI. In addition, the number of cell buffers allocated to each service class can be changed easily at the initialization.

Further, in the service classes including a plurality of different traffic types, since the priority control is executed by setting each priority order for each traffic type, it is possible to share a plurality of the service classes by use of a single switch LSI, so as to support each service class more finely.

What is claimed is:

1. An address generating circuit of shared buffer type asynchronous transfer mode switch used for an asynchronous transfer mode switching system, which comprises:
a plurality of address generating units (5) each provided for each column, for storing a routing tag indicative of an output port of each cell stored in a shared buffer (10), an address of each cell, and class data indicative of a service class of each cell, respectively; and wherein:
when a cell is inputted to or outputted from the shared buffer (10), a routing tag and an address stored in each address generating unit storing the class data the same as the class data of the inputted or outputted cell are selected and used.

2. The address generating circuit of claim 1, wherein said address generating units (5) each including:
a routing tag register (1) for storing a routing tag indicative of an output port of each cell inputted to or outputted from the shared buffer (10);
an address pointer register (2) for storing an address of each cell inputted to or outputted from the shared buffer (10);
a class data register (3) for storing class data indicative of a service class of each cell inputted to or outputted from the shared buffer (10), the class data being initialized according to the number of buffers of the service class allocated to the shared buffer; and
a control circuit (4) for controlling inputs/outputs of said routing tag register, said address pointer register and said class data register, respectively.

3. The address generating circuit of claim 2, wherein said routing tag register (1), said address pointer register (2) and said control circuit (4) for constituting each of a plurality of said address generating units (5) are connected to one another in such a way that data contents are stored in time serial manner beginning from the lowermost column side thereof.

4. The address generating circuit of claim 3, wherein when a cell is inputted to or outputted from the shared buffer (10), said routing tag register (1) and said address pointer register (2) of said address generating unit (5) of the lowermost column including said class data register (3) storing the class data the same as the class data of the inputted or outputted cell are selected and used.

5. The address generating circuit of claim 4, wherein:
   a routing tag input bus (6) for transmitting a routing tag of each cell is connected to a plurality of said routing tag registers (1); and
   an address in the address pointer register (2) is transferred to an address pointer output bus (8) as a write or read address.

6. The address generating circuit of claim 5, wherein a control bus (7) is connected to said control circuits (4), and various control data are transmitted to each of said control circuits (4) through the control bus (7).

7. The address generating circuit of claim 4, wherein in said routing tag register (1) and said address pointer register (2) of said selected and used address generating unit, when the lowermost columns thereof are allowed to be null, data stored in the columns over the null column are all shifted from columns to other columns arranged thereunder by one in sequence, respectively to fill the null columns.

8. The address generating circuit of claim 1, which further comprising multicasting means for copying an input cell and outputting the copied input cell to a plurality of output ports, respectively.

9. The address generating circuit of claim 2, wherein said address generating unit (5) comprises an additional class data register (11) for setting class data included in the cell, whenever the cell is inputted.

10. The address generating circuit of claim 9, wherein said additional class data register (11) stores data indicative of a priority sequence of traffic types in a predetermined service class including a plurality of traffic types.

11. An address generating circuit of shared buffer type asynchronous transfer mode switch used for an asynchronous transfer mode switching system, which comprises:
   a plurality of address generating units (12), each for storing a routing tag indicative of an output port of each cell stored in a shared buffer (109), an address, class data indicative of a service class, and data indicative of priority sequence of traffic types in the service class, respectively; and wherein:
      when a cell is inputted to the shared buffer (10), a routing tag and an address stored in the address generating unit storing the class data the same as the class data of the inputted cell are selected and used; and when a cell is outputted from the shared buffer (109), a routing tag and an address stored in the address generating unit storing a priority sequence and the class data the same as the class data of the outputted cell are selected and used.

12. An address generating circuit of shared buffer type asynchronous transfer mode switch used for an asynchronous transfer mode switching system, which comprises:
   a plurality of address generating units (12) each including:
      a routing tag resister (1) for storing a routing tag indicative of an output port of a cell inputted to and outputted from a shared buffer (109);
      an address pointer register (2) for storing address of a cell inputted to and outputted from the shared buffer;
      a first class data register (11), for storing data indicative of priority sequence of traffic types in a predetermined service class including a plurality of traffic types when the cell is inputted;
      a second data register (3) for storing class data indicative of the service class of the cell inputted to and outputted from the shared buffer, the class data being initialized according to the number of buffers of the service class allocated to the shared buffer; and
      a control circuit (4) for controlling inputs/outputs of the respective registers; and wherein:
   said routing tag register (1), said address pointer register (2), said first class data register (11) and said control circuit (4) for constituting each of a plurality of said address generating units (12) are connected to one another in such a way that data contents are stored in time serial manner beginning from the lowermost column side thereof;
   when a cell is inputted to the shared buffer (10), said routing tag register (1) and said address pointer register (2) of said address generating unit (12) of the lowermost column including said second class data register (3) storing the class data the same as the class data of the inputted cell are selected and used; and
   when a cell is outputted from the shared buffer (10), said routing tag register (1) and said address pointer register (2) of said address generating unit (12) of the lowermost column including said first and second class data register (11, 3) storing the priority data and the class data the same as the class data of the outputted cell are selected and used.

* * * * *